May 13, 1930.　　　　J. M. AIKMAN　　　　1,758,136
AUTOMATIC BLEEDER VALVE FOR AUXILIARY RESERVOIRS OF AIR BRAKE SYSTEMS
Filed June 21, 1928
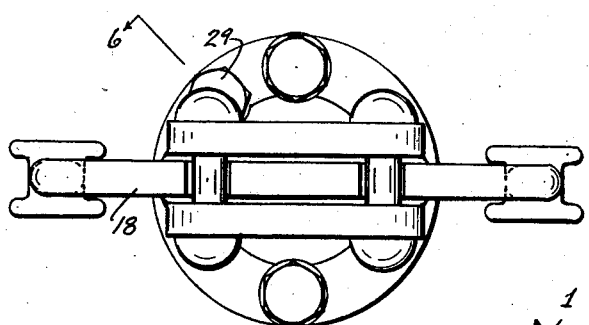
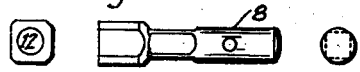
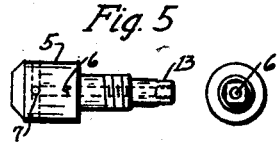
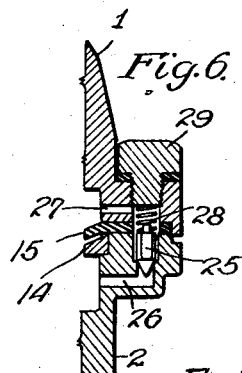
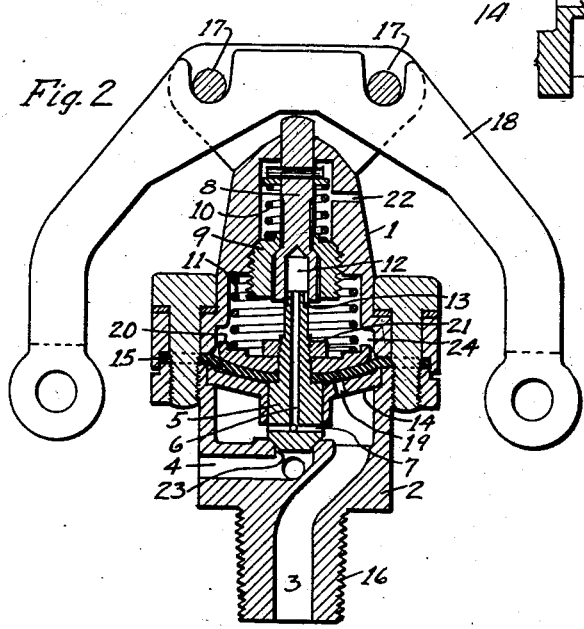
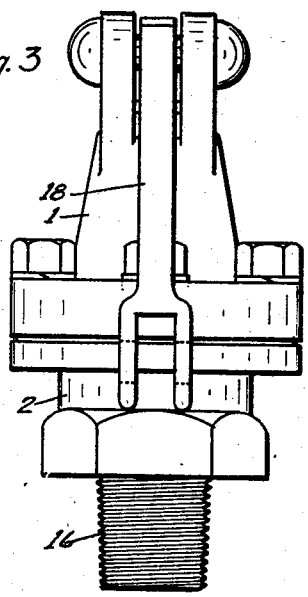
INVENTOR
Jos. M. Aikman Patented May 13, 1930

1,758,136

UNITED STATES PATENT OFFICE

JOSEPH M. AIKMAN, OF STILLWATER, MINNESOTA

AUTOMATIC BLEEDER VALVE FOR AUXILIARY RESERVOIRS OF AIR-BRAKE SYSTEMS

Application filed June 21, 1928. Serial No. 287,101.

The invention relates to air brake bleeder valves and in particular an automatic valve. The primary object is the automatic emptying of the auxiliary air reservoir by one pull on the operating lever, thus saving the time of a man holding it open as is required with the present bleeder valve.

Another feature is the provision of a means of preventing the emptying of the reservoir by accidental or intentional pulling of the lever when the pressure in the reservoir is above that resulting from a full application of the brakes.

I attain these objects by the mechanism illustrated in the accompanying drawing in which:

Figure 1 is a view of the top of the valve;
Figure 2 is a cross section thru the valve;
Figure 3 is a side view of the exterior of the valve; Figure 4 is a detail of the pilot valve;
Figure 5 is a detail of the main valve; and
Figure 6 is a section showing the auxiliary valve.

Referring to the drawing, the valve consists of an upper body 1, a lower body 2, an inlet port 3, outlet ports 4, main valve 5, vertical passage 6 in valve 5, inlet ports 7 connecting with passage 6, pilot valve 8, seat and guide 9 for pilot valve, pilot valve spring 10, main valve spring 11, recess 12 in pilot valve, ports 13 at upper end of main valve, lower guide 14 for main valve, diaphragm 15, threaded connection 16 to screw into reservoir, fulcrum pins 17, operating lever 18, air inlet 19 to space below diaphragm, pressure plate 20 for diaphragm, clamp nut 21, outlet port 22 for pilot valve, seat 23 for main valve, chamber 24 above diaphragm, auxiliary valve 25, inlet 26 to auxiliary valve, outlet 27 from auxiliary valve, spring 28, and cap 29.

The operation of the valve is as follows:

Air pressure from the reservoir enters thru the inlet 3 and passes thru port 19 to the under side of the diaphragm 15, thru ports 7, 6, and 13 to the chamber 24 above diaphragm 15, thus equalizing the pressure above and below the diaphragm 15. Spring 11 is of the required strength to exert a pressure equal to 2½ lbs. per square inch and this pressure combined with the air pressure above the valve seat 23 holds the valve 5 closed.

Spring 10 holds the pilot valve 8 closed thus preventing the escape of air from the chamber 24. Lever 18 has rods attached to its lower ends and which extend to the sides of the car. When it is desired to relieve the pressure from the reservoir after spotting a car, a pull on either rod pushes the pilot valve 8 downward. In moving downward the lower end of the pilot valve covers the ports 13 at the upper end of the main valve 5, thus preventing air from below diaphragm 15 reaching the chamber 24 above it. The pilot valve 8 also moves away from its seat 9 and allows the air in chamber 24 to pass out thru port 22. When the pressure in chamber 24 has dropped 2½ lbs., the pressure below the diaphragm 15 pushes it upward thus raising valve 5 from its seat 23. The raising of valve 5 causes the ports 7 to be covered by guide 14, thus cutting off the passage of air thru port 6. This seals the ports at top and bottom of valve 5. The air in the reservoir passes out thru the passage 3 and ports 4 to the atmosphere.

When the reservoir pressure drops to 5 lbs. the spring 11 begins to push the valve 5 downward, thus uncovering ports 7 and 13 and allowing air to enter the chamber 24 which equalizes the pressure above and below the diahpragm 15. The pilot valve 8 returns to its seat as soon as the rod is released and is in a position so that ports 7 and 13 will be uncovered at the same time, as valve 5 descends. The spring 11 forces valve 5 against its seat 23 thus restoring the valve to its original position.

By following the above operation, it will be seen that it is unnecessary to exert a continuous pull on lever 18 to empty the reservoir, as one quick pull is sufficient to release the air from the chamber 24 and open the valve. It will also be seen that the valve will remain open as long as the pressure in the reservoir is above 5 lbs. and it is evident that should the valve be tripped while there is full pressure on the train pipe, it would stay open and form a continuous air leak.

To prevent the above undesirable result I have provided the auxiliary valve 25. The spring 28 is adjusted so as to hold valve 25 closed up to 50 lbs. which is the pressure in the reservoir after a full application of the brakes. Should the valve be tripped with the brakes released and with full pressure in the train pipe and auxiliary reservoirs, the auxiliary valve 25 functions as follows:—

A drop in pressure in chamber 24 allows valve 25 to rise from its seat, thus permitting air from the reservoir to pass thru port 26, around valve 25 and thru port 27 into the chamber 24 and equalize the pressure above and below diaphragm 15. The valve 5 is hereby prevented from rising from its seat.

As the spring 11 exerts a pressure of 2½ lbs. downward, a differential of 2½ lbs. can take place above and below the diaphragm 15 before the main valve 5 begins to rise. This differential of 2½ lbs being ample to cause a flow of air thru the auxiliary valve 25, thus quickly equalizing the pressure above and below the diaphragm 15 and preventing the valve 5 from opening. As the ports 13 would be closed by a downward movement of the pilot valve 8 and prevent the passage of air thru ports 6 and 7, the auxiliary valve 25 provides a bypass for this emergency.

Having described my invention, what I claim is—

1. In a bleeder valve, the combination with a body, a valve seat therein, inlet and outlet ports from said seat, a main valve resting on said seat and arranged to open and close said ports, a guide for lower end of said valve, a diaphragm and pressure plate attached to said valve, passages in said valve, a spring engaging with said pressure plate and holding said valve closed, chambers above and below said diaphragm, a pilot valve with combined seat and guide, a recess in said pilot valve forming a guide for the upper end of said main valve, said pilot valve opening and closing ports at the upper end of said main valve, an outlet for said pilot valve, a spring holding said pilot valve closed, a lever for opening said pilot valve, a bypass around said diaphragm and connecting said chambers above and below said diaphragm, a valve seat in said bypass, a valve resting on said seat, a spring holding said valve against said seat, said guide for lower end of said main valve arranged to open and close ports in lower end of said main valve.

2. In a bleeder valve, the combination with a main valve, a diaphragm and pressure plate attached thereto, chambers above and below said diaphragm, a passage in said main valve connecting said chambers, a pilot valve to open and close a port connecting said chamber above said diaphragm with the atmosphere, a guide at the lower end of said pilot valve for said main valve and arranged to open and close ports at upper end of said main valve, and springs holding said pilot valve and main valve closed.

3. In a bleeder valve, the combination with a body, a main valve therein, inlet and outlet ports for said valve, a diaphragm attached to said valve, chambers above and below said diaphragm, a pilot valve for relieving the pressure in said chamber above said diaphragm, said chamber below said diaphragm being continuously in communication with the auxiliary reservoir thru said inlet port, a passage in said body forming a bypass around said diaphragm, a valve and seat in said passage, and a spring holding said valve closed.

4. The combination with a main valve opening a port to allow the escape of air from the auxiliary reservoir, a diaphragm attached to said valve, a pilot valve to release the pressure above said diaphragm and allow said diaphragm to raise said main valve from its seat, and an auxiliary valve arranged to prevent the pressure above said diaphragm being relieved sufficiently to allow said main valve to open before a full brake application has been made.

5. A bleeder valve, comprising a main valve, a pilot valve, and an auxiliary valve, said valves held to their seats by springs, a lever to open said pilot valve, a port leading from said auxiliary valve to said pilot valve, a port leading from said pilot valve to the atmosphere, said port from said pilot valve being smaller than said port from said auxiliary valve.

6. In a bleeder valve, the combination with a body, a main valve, a pilot valve an auxiliary valve, springs for said valves, ports connecting said valves, a lever operating said pilot valve, said springs and said ports so proportioned that by holding pilot valve open it releases air continuously from auxiliary reservoir within a range from 70 lbs. down to 50 lbs. pressure, and so that below 50 lbs. a momentary pull on said lever will cause said main valve to open and remain open until said pressure in auxiliary reservoir is reduced to 5 lbs.

7. A bleeder valve comprising a body, a main valve, a pilot valve, an auxiliary valve, springs for said valves, a diaphragm for said main valve, ports in said body connecting said valves, a lever operating said pilot valve, all arranged to open and close a port from auxiliary reservoir thru said valve to atmosphere within a range from 70 lbs. to 50 lbs. by pulling and releasing said lever, and to automatically open said main valve and form a continuous outlet for air from auxiliary reservoir down to 5 lbs. by a single pull on said lever when auxiliary reservoir pressure is below 50 lbs.

JOS. M. AIKMAN.